Aug. 9, 1932.    R. B. FAGEOL    1,871,432
MULTIPLE WHEEL ROAD VEHICLE
Filed June 11, 1925    5 Sheets-Sheet 1
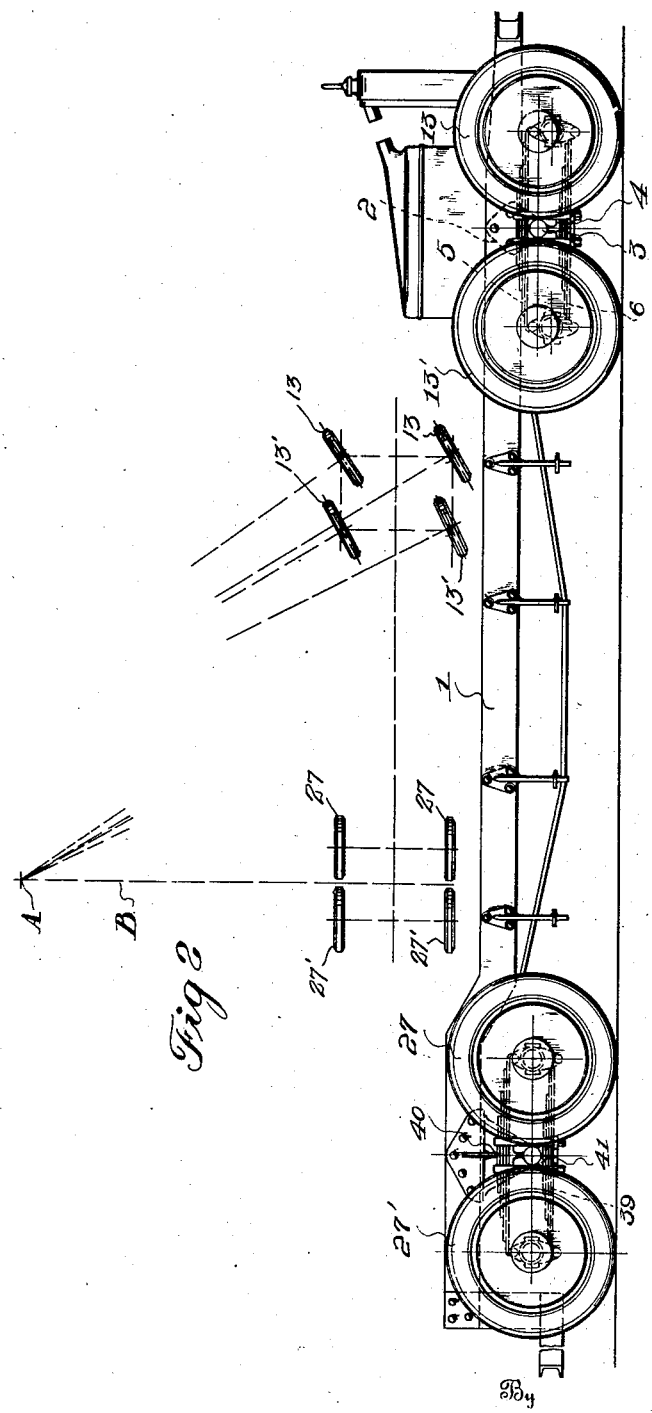

Aug. 9, 1932.       R. B. FAGEOL       1,871,432
MULTIPLE WHEEL ROAD VEHICLE
Filed June 11, 1925    5 Sheets-Sheet 2
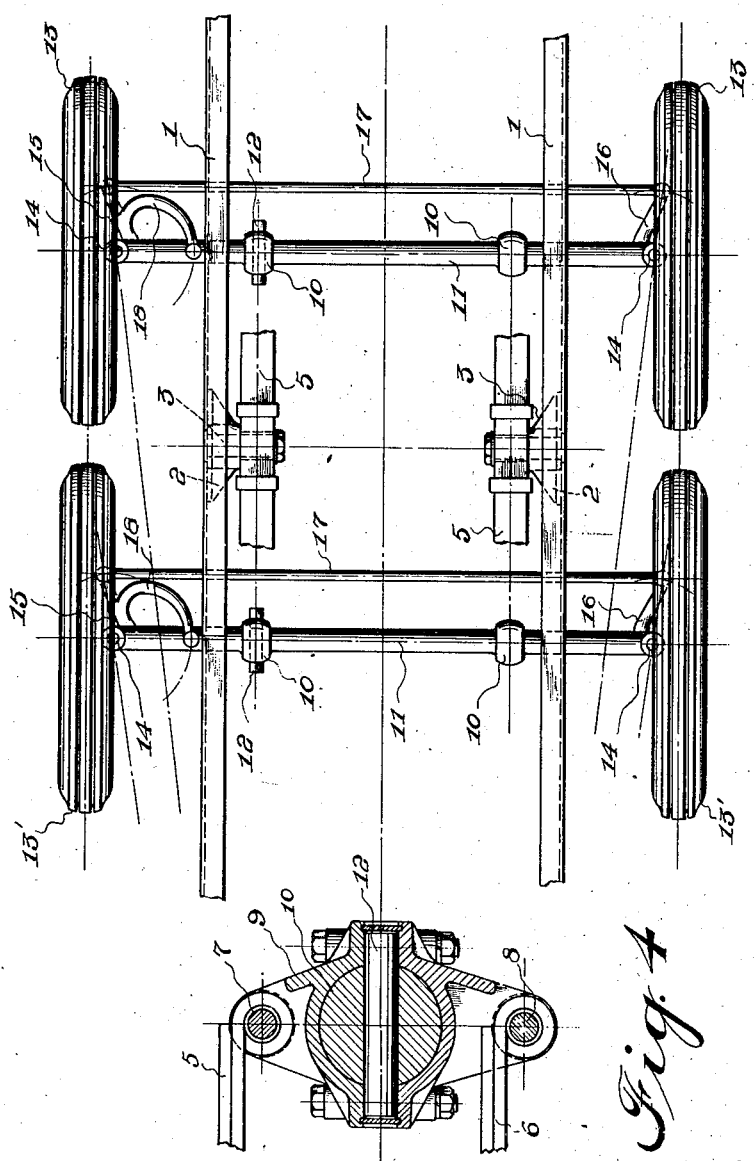

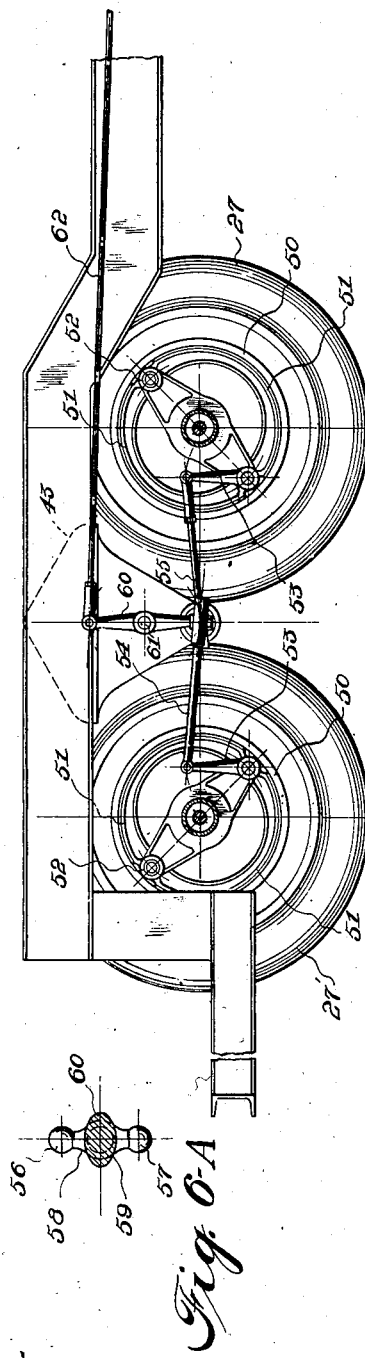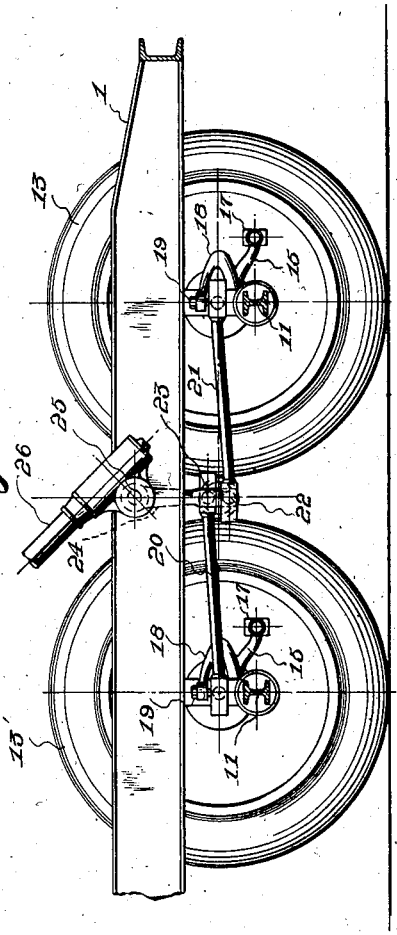

Aug. 9, 1932.  R. B. FAGEOL  1,871,432
MULTIPLE WHEEL ROAD VEHICLE
Filed June 11, 1925  5 Sheets-Sheet 4
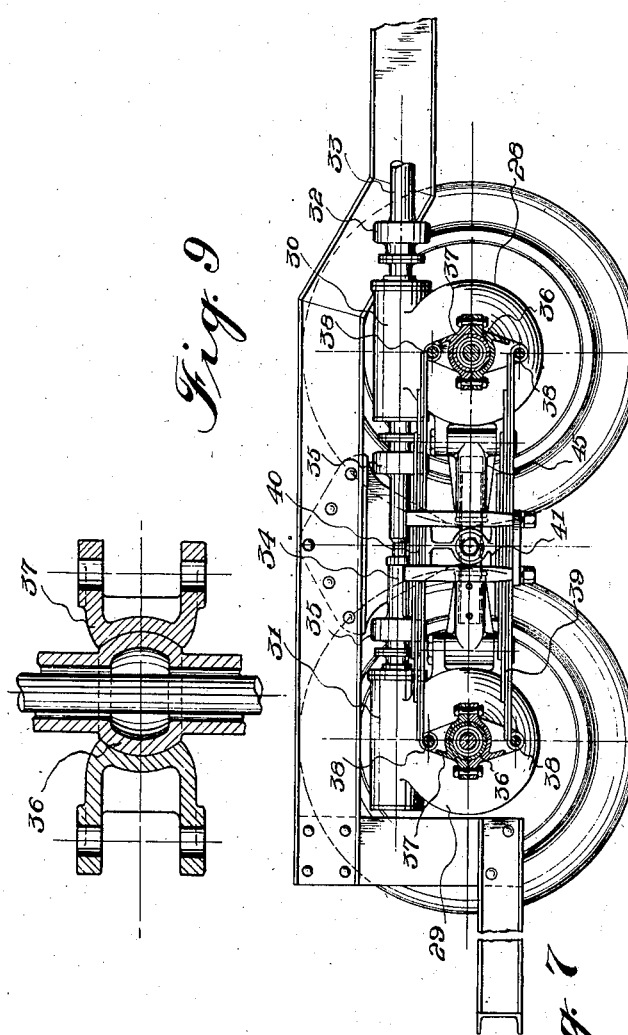
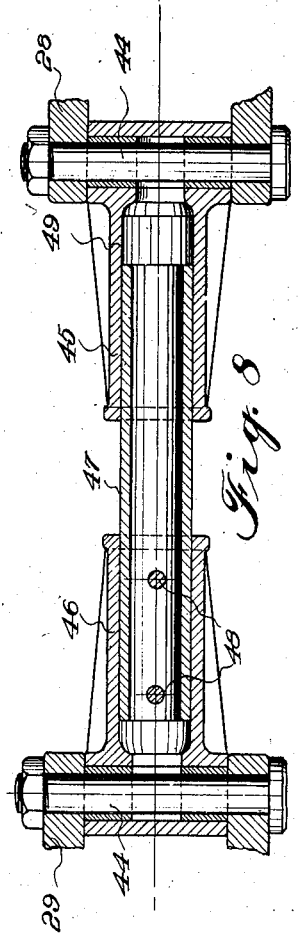
Inventor
Rollie B. Fageol
By William A. Strauch
Attorney Aug. 9, 1932.  R. B. FAGEOL  1,871,432
MULTIPLE WHEEL ROAD VEHICLE
Filed June 11, 1925  5 Sheets-Sheet 5

Inventor
Rollie B. Fageol
By William A. Strauch
Attorney

Patented Aug. 9, 1932

1,871,432

UNITED STATES PATENT OFFICE

ROLLIE B. FAGEOL, OF LOS ANGELES, CALIFORNIA, ASSIGNOR, BY MESNE ASSIGNMENTS, TO AUTOMOTIVE ENGINEERING CORPORATION, A CORPORATION OF DELAWARE

MULTIPLE WHEEL ROAD VEHICLE

Application filed June 11, 1925. Serial No. 36,543.

The present invention relates to improvements in multiple wheel road vehicles, and the present application is a continuation in part of copending applications Serial No. 448,835, filed March 1, 1921; Serial No. 470,627, filed May 18, 1921, now Patent #1,660,189, granted February 21st, 1928; and Serial No. 512,243, filed Nov. 2, 1924, now Patent #1,660,188 granted February 21st, 1928.

More particularly the invention relates to a road vehicle in which the frame movements are substantially less than the wheel movements minus the actual spring deflections, and the loads are equalized at each end of the vehicle in such a manner that pneumatic tires may be economically used for very heavy loads.

Prior proposed multiple wheel vehicles have proven commercially unsatisfactory due to the failure to provide flexible drive and steering arrangements of proper design to meet road conditions, the use of ineffective torque resisting arrangements, and various other defective constructions. A further material defect in the prior constructions consists in the fact that rail car practice has been largely followed in connecting the frame to the trucks with the result that a fore and aft movement is transmitted to the frame as the wheels pass over the road irregularities. Substantial road irregularities are not present in rail car road beds and for this reason rail car practice cannot be applied. The fore and aft movements introduced in the vehicle cause reversals of movements and set up undue stresses with the result that such constructions are commercially unsatisfactory. A still further defect in the prior constructions consists in a failure to compensate in braking and steering controls for the relatively great motion of the wheels with relation to the frame and failure to equalize the braking effect, with the result that drag is introduced in the wheels because of the distortion of the steering alignment and the brakes fail to function properly as the vehicle passes over the road irregularities. The life of the steering and braking constructions for this reason has been very limited, and the cost of maintenance of the prior constructions has been too high to make them wholly suited for commercial use. A further defect in prior multiple wheel constructions which is prevented through commercial adoption is the fact that the manner of designing the steering controls has been such as to require steering of one or more sets of wheels at the rear end of the trucks. This has complicated prior constructions and makes them expensive to maintain and unsatisfactory for commercial use.

Accordingly the objects of the present invention are to provide a flexible truck arrangement for multiple wheel trucks in which a substantial motion of translation of the axles with respect to each other, and compound rotary motions of the axles with respect to the frame is permitted, and in which the torque reactions of the housings are opposed independently of the frame; to provide a multiple wheel road vehicle construction in which fore and aft movements are substantially eliminated and in which the axle movements with relation to the frame are substantially eliminated, and in which the axle movements with relation to the frame are substantially less than the wheel movements minus the spring deflection; to provide multiple road vehicle constructions with brake and steering control and equalizing connections which compensate for the relative motions of the wheels and axles with relation to each other and to the frame without affecting the action of the brakes on the wheels or distorting the steering alignment to provide a multiple-wheel road vehicle in which the wheels under the forward end only are steering wheels and in which the drag of the non-steering wheels when the vehicle is turning is substantially eliminated; and to provide a multiple wheel road vehicle in which heavy loads may be carried on pneumatic tires.

Further objects of the invention are the production of an efficient and durable multiple wheel road vehicle in which the disadvantages of the prior constructions above set forth are substantially eliminated. Still further objects of the invention are such as may be attained by a utilization, of the principles, combinations and sub-combinations hereinafter set forth in a description of a preferred embodiment of the invention and as defined by the terms of the appended claims.

Referring to the drawings:

Figure 1 is a side elevation of a truck chassis embodying the invention.

Figure 2 is a diagrammatic plan view showing the manner in which the steering wheels track around a common point.

Figure 3 is a plan view of the front truck with parts broken away to show the steering and torque resisting connections.

Figure 4 is a sectional view through a front spring hanger.

Figure 5 is a side elevation of the front truck with parts omitted to show the steering connections.

Figure 6 is a side elevation of the rear truck with parts omitted to show the braking lever arrangements.

Figure 6A is a fragmentary sectional view through the brake actuating arm showing the brake equalizer.

Figure 7 is a side elevation of the rear truck arrangement showing the torque resisting connections.

Figure 8 is a fragmentary sectional view showing the torque tube construction.

Figure 9 is a sectional view of the rear spring hanger.

Figure 10:
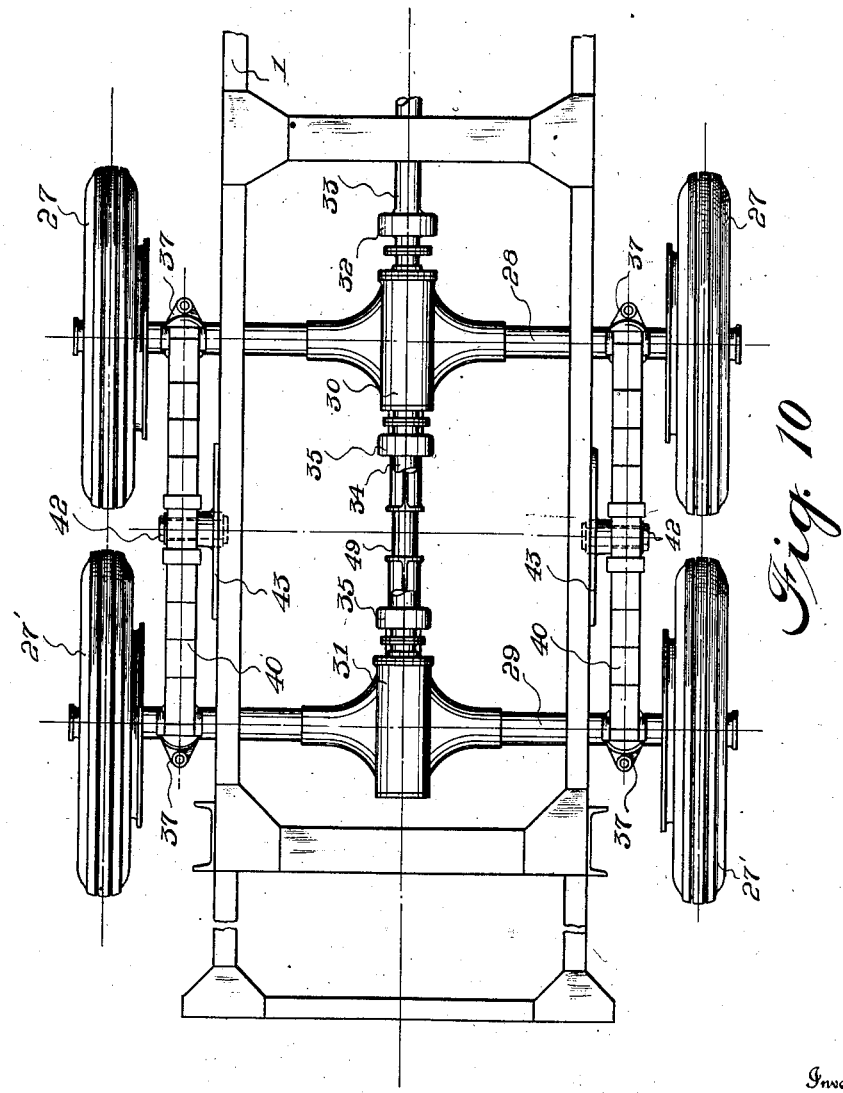
Figure 10 is a plan view of the rear drive truck.

The frame 1 has secured at its forward end a pair of trunnion supporting members 2 (Figs. 1 and 3) which extend downward from the frame. At a point substantially below the frame, trunnion pin 3 is secured in and extends inwardly through each supporting member 2. The trunnion pins 3 are supported and journalled in the trunnion blocks 4 which in turn are supported substantially midway between and rigidly secured to the leaf springs 5 and 6 by suitable saddles, or in any other manner. The ends of the springs 5 and 6 are pivotally secured by means of the pins or bolts 7 and 8 to the spring supporting hangers 9. The hangers 9 are seated on the ball members 10 which are formed integrally with the load carrying axles 11. Extending through the hangers 9 and the balls 10 preferably on that side only of the axles 11 where the steering force is applied are torque pins 12. A pair of steering wheels 13 and 13' are pivotally secured by means of king-pins 14 to, and support, each of the axles 11. Wheels 13 and 13' are provided with steering arms 15 and 16 for turning the same about the king-pins to effect steering movements of the wheels, and rods 17 interconnect the steering arms 15 and 16 in a manner to effect simultaneous steering movements of each pair of wheels 13 and 13'. Each of the arms 15 is provided with an extension 18 connected by members 19 to the steering links 20 and 21 (Fig. 5). The connection of members 20 and 21 to the members 19 is preferably made by a standard ball and socket joint with suitable spring arrangements to take up lost motion. The inner ends of the arms 20 and 21 are connected preferably by means of ball and socket joints at 22 and 23 to a steering actuating arm 24. The arm 24 is pivotally supported from the frame 1 on a suitable spindle 25 and the spindle 25 is rotated by means of the steering column 26 through a suitable worm or other gear connection in well known manner.

It will be noted that the center lines of the trunnions under normal load conditions as shown in the drawings, are substantially in the plane of the wheel centers. Fore and aft movements are eliminated as the vehicle moves over road irregularities and as the wheels are free to oscillate about the trunnion axes as the center of the frame load is equalized between the axles, and the movement of the frame will be substantially vertical and equal to one-half of the axle deflection except as modified by the actual spring deflection. Because of the nature of the connection of the spring hangers to the axles a limited translatory motion in all directions of the axles with relation to each other is permitted and a limited compound rotary motion of each axle with relation to the frame may occur. The torque pins 12, however, prevent rotation of the axles about the wheel centers. The elimination of fore and aft movement of the axles with relation to each other is an important improvement of the present invention over the prior art.

As heretofore proposed no compensation for the spring deflection or for the relative motion between the frame carried steering control members and the wheel supported steering links has been provided in vehicles with multiple axle front steering. Without suitable compensation heavy strains are set up in the steering connections and as the wheels travel over road irregularities the steering alignment thereof is distorted, introducing a substantial drag in the wheels. In the present invention it will be noted that the connection between the wheel and axle supported steering links and the frame carried steering control members is made at points 22 and 23 on the arm 24, which are substantially at the intersection of the trunnion axis with arm 24 when the wheels 13 and 13' are in alignment. By making the connection in this manner the point of attachment between the wheel and the frame carried members is substantially on a common axis of relative motion between the axle and the frame carried members and substantially no distortion of the steering alignment of the wheels 13 and 13' occurs due to the movements of the axles with relation to each other and to the frame. As the effective length of the springs varies under load and road conditions the angularity of the rods 20 and 21 will change by an amount which will permit the relative translational movement of the axles with relation to each other without interference and without distorting the steering alignment of the wheels due to this movement. The durability, life, and riding qualities of a truck embodying my invention are accordingly materially improved over prior constructions.

Prior to the present invention it has been common practice in multiple wheel motor vehicle construction to provide one or more sets of steering wheels at the rear of the frame. Because of the length of the frame and the relative spacing of the front and rear trucks this was believed to be essential to effect proper steering of the vehicle under road conditions. By providing a rear truck with two pairs of non steering wheels 27 and 27', providing each wheel with pneumatic tires, and proportioning the steering linkages so that each pair of wheels 13 and 13' will track around a common center A lying in a line B midway between the axes of rear wheels 27 and 27' and perpendicular to the longitudinal axis of the chassis as shown in Fig. 2, the necessity for steering rear wheels is eliminated. With my improved construction the side wall deflection of the tires on the wheels 27 and 27' is substantially equalized, and the drag of the rear wheels as the vehicle turns is substantially eliminated without the provision of rear wheel steering mechanisms. It will be noted that in this manner a practical multiple wheel truck chassis is provided in which the rear wheels are non-steering and only the front wheels are steered.

The rear sets of driving wheels 27 and 27' (Figs. 1, 7 and 10) are mounted and driven by differentially driven axle shafts which are journaled in the housings 28 and 29 in well known manner. The differential mechanisms located in the center of housings 28 and 29, are driven by drive worms mounted in casings 30 and 31 which are disposed substantially above the wheel centers. The forward drive worm is driven through a universal joint 32 from a spline shaft which in turn is driven from a motor located in the forward end of the frame in well known manner. The rear drive worm is driven from the forward drive worm by means of an intermediate telescoping drive shaft 34 in which are interposed two universal connections 35. The drive axle and intermediate drive shaft connections are of well known constructions and further details are unnecessary for a full understanding thereof. Formed on each of the axle housings 28 and 29 are the ball members 36 upon which the spring supporting ball hangers 37 are universally supported. Pivotally secured to the ball hangers 37 by means of pins 38, and interconnecting axles 28 and 29 are leaf springs 39 and 40. Trunnion blocks 41 are supported midway between the springs 39 and 40 rigidly secured thereto by means of saddles or in any other suitable manner. Journalled in the trunnion blocks 41 are the rear supporting trunnion pins 42 which in turn are secured in the trunnion frame members 43. Trunnion frame members 43 are secured to the frame 1 and support the rear end of the frame substantially above the level of the trunnion axes, and the trunnion axes are substantially in the plane of the axes of the wheels 27 and 27' under normal load conditions as shown in the drawings.

Secured between extensions of the axle housings 28 and 29 by means of the vertical pivot pins 44 are torque resisting socket members 45 and 46. (Figs. 7 and 8.) Member 46 is provided with a recess in which the tubular member 47 extends and is secured by means of pins 48. The other end of member 47 fits slidably or telescopically and rotatably into recess 49 in the member 45. The proportions and arrangements of the parts 44 to 49 are such that under normal load conditions movement of the housings 28 and 29 with relation to each other and with relation to the frame are permitted, while at the same time rotation of the housings about the axes of wheels 27 and 27' is prevented, and the alignment of the intermediate shaft and the axles as the wheels move over road irregularities is substantially maintained.

Each of the wheels 27 and 27' is provided with a brake drum 50 (Fig. 6) within which the brake shoes 51 pivoted at points 52 are mounted. Suitable cam members (not shown) for spreading the brake shoes apart are provided and are actuated by the arms 53. The free ends of the cam arms 53 are pivotally secured to the brake actuating links 54 and 55. At their inner ends the links 54 and 55 are secured to the balls 56 and 57 (Fig. 6A) of equalizing member 58 by means of ball and socket connections in a well known manner. The equalizing connection 58 is secured by means of a ball and socket joint 59 to a brake actuating arm 60 which in turn is pivotally supported from and secured to the trunnion bracket 43 by means of a suitable spindle 61. The upper end of the arm 60 is pivotally connected to the brake rod 62 which is suitably supported on the frame and actuated in any well known manner.

I claim:

1. A road vehicle comprising a frame, a pair of substantially parallel axles disposed at each end of said frame, a pair of non-dirigible wheels on each axle at the rear of the frame, the peripheries of adjacent wheels on the same side of the vehicle being disposed relatively close to each other, a pair of dirigible wheels on each axle at the forward end of the frame, and means to simultaneously control said dirigible wheels, said last named means being so designed that the vehicle is caused to track about a point lying in a vertical plane substantially midway between the rear pair of axles, whereby the vehicle may be turned without introducing substantial drag in the non-dirigible wheels.

2. A road vehicle comprising a frame, tandem axles supporting the rear end of said frame, a pair of resilient tired non-dirigible wheels on each axle, the peripheries of adjacent wheels on each side of said vehicle being disposed relatively close to each other, means including dirigible wheels to support the forward end of said frame, and means to control said last named wheels designed to cause the vehicle to track about a point lying in a vertical plane substantially midway between said rear axles, whereby the vehicle may be turned without introducing substantial drag in the non-dirigible wheels.

3. A road vehicle comprising a frame; a pair of substantially parallel drive axles disposed at the rear of said frame; a pair of non-steering, pneumatic-tired wheels supporting each drive axle; said axles being so arranged that the peripheries of the wheels on the same side of the vehicle are relatively close together, a set of steering wheels disposed beneath the front end of said frame; and control means for causing said steering wheels to track substantially around a common center lying in a line substantially perpendicular to the longitudinal axis of the frame at a point substantially midway between said drive axles.

4. A road vehicle comprising a frame; a pair of substantially parallel axles disposed at one end of said frame; a pair of ground engaging wheels supporting each of said axles; springs interconnecting said axles, and said frame; said springs being pivoted to the frame intermediate their ends and connected to said axles at their ends, the axes of said connections and pivot lying substantially in the same plane under normal load conditions whereby substantial rocking movement of the frame in a horizontal plane due to road irregularities is prevented.

5. A road vehicle comprising a frame, a pair of substantially parallel axles disposed at one end of said frame, a pair of ground engaging wheels supporting each of said axles, a spring interconnecting said axles and frame, said spring being pivoted to said frame intermediate the spring ends, and connected to said axles at its ends by a universal connection, the axes of said pivotal connection and said axles lying in the same plane under normal load conditions, whereby fore and aft movement and lateral rocking of the frame is substantially prevented.

6. A road vehicle including a frame; a pair of tandem axles at each end of said frame; springs interconnecting each pair of axles to the frame so as to distribute the load equally between the axles; said frame being connected to said springs at two longitudinally spaced points on each side of said frame; the axes of the connections between said springs and frame and between said springs and axles lying in substantially the same horizontal plane under normal load conditions so as to permit the movements of the axles incident to the movement of the vehicle over road irregularities without causing rocking movement of the frame in a substantially horizontal plane.

7. A road vehicle including a frame, a tandem axles disposed so as to support one end of the frame, springs connecting said axles together, said springs being trunnioned to said frame between the axles, the springs extending substantially horizontally under normal load conditions and said trunnion being so disposed that the axis thereof lies in the plane containing the axes of the axles under the same conditions.

8. A road vehicle comprising a frame; a pair of substantially parallel axles disposed beneath the forward end of said frame; dirigible wheels supporting said axles; a pair of substantially parallel drive axles disposed beneath the rear end of said frame; ground engaging wheels supporting said drive axles; and means comprising springs interconnecting said axles and said frame each of said springs being connected to said axles at its ends and pivoted to the frame between its ends in a manner to equalize the frame load between each pair of axles and to reduce the frame movement substantially below the axle movement minus the spring deflection as the vehicle passes over road irregularities the points of pivotal movement between said frame and springs being disposed in substantially the same horizontal plane under normal load conditions.

9. The combination as set forth in claim 8 together with brake and steering actuating members carried by said wheels independently of said frame; brake and steering control members carried by said frame; and connections between said frame and said wheel carried members compensating for the relative motion of said wheels with relation to said frame, said connections being made to said frame at points that are approximately in transverse alignment with the points of connection between the frame and springs.

10. A road vehicle including a frame; tandem axles; springs pivoted to said frame between the spring ends; and means connecting said axles to said spring ends so that the axles are free to rotate with respect to said spring ends, the axes of said pivot and last named means lying substantially in a horizontal plane under normal load conditions.

11. A road vehicle including a frame; tandem axles supporting one end of said frame; spring hangers journaled on said axles;

springs interconnecting said hangers arranged above and below the plane containing the axes of said axles; and means pivotally connecting said springs to said frame, said means being so disposed that the axis of said pivotal connection lies substantially in said plane under normal load conditions.

12. A road vehicle comprising a frame; a pair of axles at each end of said frame; dirigible wheels on one pair of said axles; non-dirigible wheels on said other pair of axles, adjacent non-dirigible wheels on the same side of the vehicle being spaced so that their peripheries are relatively close together; resilient tires on said non-dirigible wheels; and means to simultaneously steer the dirigible wheels, said steering means being designed to cause said dirigible wheels to track about a point lying in a plane that passes transversely through the frame at a point substantially midway between the axles carrying the non-dirigible wheels.

13. A road vehicle comprising a frame, tandem axles supporting one end of said frame, springs arranged above and below said axles and secured to said axles at their ends and pivoted to the frame between their ends, the axes of said pivot and of the axles lying substantially in a horizontal plane under normal load conditions.

14. A road vehicle including a frame, a plurality of axles, wheels on each axle, springs pivotally connecting said axles to said frame so that the axles are capable of substantial swinging movement, said springs being attached to each axle at points adjacent the sides of the vehicle, the connection between spring and axle at one side of the vehicle being designed to prevent rotation of the axle on its axis and the connection at the other side of the vehicle being designed to permit relative rotation between the axle and the spring.

15. A road vehicle including a frame, a plurality of axles, wheels on each axle, springs at each side of said vehicle pivoted to said frame, connections between said springs and said axles adjacent said sides, the connection between each axle adjacent one side being such as to permit relative rotation of the axle about its axis and the connection adjacent the other side of the vehicle being such as to prevent such relative rotation.

16. The combination defined in claim 15 in which one of the connections is a universal connection and the other of which comprises a universal connection and a trunnion at right angles to the axle axis.

17. In a motor vehicle, a plurality of axle housings, said axle housings interconnected by a plurality of springs, two-part brackets universally connected to the axle housings, pivotal connections between the ends of the springs to the brackets above and below the axle.

18. In a motor vehicle, a pair of axle housings, said axle housings interconnected by a pair of springs, brackets universally connected to the axle housings, pivotal connections between the ends of the springs to said brackets above and below the axle, a center spring bracket rigidly connected to the springs and holding them in spaced relation with each other, said spring bracket in pivotal connection with a stationary member of the frame.

In testimony whereof affix my signature.

ROLLIE B. FAGEOL.